(12) United States Patent
Bueche et al.

(10) Patent No.: US 7,198,483 B2
(45) Date of Patent: *Apr. 3, 2007

(54) BURNER UNIT AND METHOD FOR OPERATION THEREOF

(75) Inventors: Dirk Bueche, Stuchlingen (DE); Rolf Dornberger, Neuhausen am Rheinfall (CH); Petros Koumoutsakos, Zurich (CH); Christian Oliver Paschereit, Berlin (DE); Bruno Schuermans, Basel (CH); Peter Stoll, Ammerbuch-Poltringen (DE)

(73) Assignee: Alstom Technology Ltd., Baden (CH)

( * ) Notice: Subject to any disclaimer, the term of this patent is extended or adjusted under 35 U.S.C. 154(b) by 0 days.

This patent is subject to a terminal disclaimer.

(21) Appl. No.: 10/470,556

(22) PCT Filed: Jan. 30, 2002
(Under 37 CFR 1.47)

(86) PCT No.: PCT/IB02/00281

§ 371 (c)(1),
(2), (4) Date: Sep. 21, 2004

(87) PCT Pub. No.: WO02/061337

PCT Pub. Date: Aug. 8, 2002

(65) Prior Publication Data

US 2005/0032013 A1    Feb. 10, 2005

(30) Foreign Application Priority Data

Jan. 30, 2001 (DE) ................. 101 04 150

(51) Int. Cl.
*F23N 1/02* (2006.01)
*F23C 7/00* (2006.01)

(52) U.S. Cl. .................. 431/12; 431/351; 60/39.281
(58) Field of Classification Search ............. 431/12 O, 431/351 X, 352; 60/39.281 X, 737, 446; 137/6

See application file for complete search history.

(56) References Cited

U.S. PATENT DOCUMENTS

| 4,735,052 A | | 4/1988 | Maeda et al. | |
|---|---|---|---|---|
| 5,261,222 A | | 11/1993 | Napoli | |
| 5,339,635 A | | 8/1994 | Iwai et al. | |
| 5,361,586 A | * | 11/1994 | McWhirter et al. | ........... 60/737 |
| 5,713,206 A | * | 2/1998 | McWhirter et al. | ........... 60/747 |
| 5,802,854 A | | 9/1998 | Maeda et al. | |
| 5,835,974 A | * | 11/1998 | Nagy | .......... 73/1.06 |
| 6,092,363 A | | 7/2000 | Ryan | |
| 6,095,793 A | * | 8/2000 | Greeb | .......... 431/12 |
| 6,606,580 B1 | * | 8/2003 | Zedda et al. | ............. 702/185 |

FOREIGN PATENT DOCUMENTS

| DE | 195 18 634 A1 | 10/1995 |
|---|---|---|
| DE | 44 46 945 A1 | 7/1996 |
| EP | 0 592 717 A1 | 4/1994 |
| EP | 0 969 192 A1 | 1/2000 |
| EP | 0 985 810 A1 | 3/2000 |
| EP | 1 067 338 A2 | 1/2001 |
| GB | 2 287 312 A | 9/1995 |
| GB | 2 323 428 A | 9/1998 |
| WO | 00/73861 | 12/2000 |

OTHER PUBLICATIONS

Search Report from DE 101 04 150.0 (Jun. 21, 2004).
Search Report in International Application PCT/IB02/00281 (Apr. 16, 2002).
Paschereit, C.O., et al., "Structure and Control in Thermoacoustic Instabilities in a Gas-turbine Combustor", Combust. Sci. and Tech., vol. 138, pp. 213-232 (1998, Overseas Publishers Association N.V., Malasia).

\* cited by examiner

*Primary Examiner*—Alfred Basichas
(74) *Attorney, Agent, or Firm*—Cermak & Kenealy, LLP; Adam J. Cermak (57) ABSTRACT

Arranged upstream of each swirl-stabilized premix burner (1) of a burner system there is respectively an adjustable distributing device (5) with control valves ($V_1, \ldots, V_8$) and/or on/off valves ($V''_1, \ldots, V''_{16}$), by means of which various axial mass flow distributions of the fuel introduced can be set. Preferably, those which have particularly favorable values with respect to characteristics such as $NO_x$ emission and maximum amplitudes of pulsations occurring are chosen. For this purpose, Pareto solutions are determined with respect to the said characteristics, in that a distributing device (5) is represented by a tree structure with distributing parameters, and values for the distributing parameters on the basis of which the distributing device (5) is set by means of a control unit are iteratively generated in a data-processing system by an evolutionary algorithm. On the basis of the values determined by a measuring unit, solutions which are especially favorable with respect to the characteristics mentioned, especially Pareto-optimal, are selected. The distributing devices are then set during operation on the basis of the solutions of this type corresponding to respective requirements.

9 Claims, 6 Drawing Sheets

BURNER UNIT AND METHOD FOR OPERATION THEREOF

This is a national stage application under 35 U.S.C. § 371 of International application number PCT/IB02/00281, filed 30 Jan. 2002, and claims priority therethrough under 35 U.S.C. § 119 to German application number 101 04 150.0, filed 30 Jan. 2001.

TECHNICAL FIELD

The invention relates to a burner system gas turbines, and to a method for operating a system of this type.

PRIOR ART

It is known that burner systems of the generic type, with customary swirl-stabilized premix burners, in which the fuel is introduced with constant distribution over the length, have problematical characteristics in various respects to do with the way in which the combustion proceeds. In particular if such a system is operated outside the optimum working range, for example with part-load, the exhaust gases often contain a considerable proportion of pollutants, especially $NO_x$. Pulsating combustion also often occurs, inducing pressure waves which subject the gas turbine to high mechanical loads and reduce its service life.

To alleviate these problems, it has been proposed to stabilize the combustion by influencing the pressure in the burner system by means of feedback. For this purpose, in that case the pressure was measured and the measured signal fed in again in a phase-shifted manner via loudspeakers. In this way it was possible to achieve a more stable combustion and, as a result, a reduction in the pulsations and also the NO and CO emissions. See in this respect C. O. Paschereit, E. Gutmark, W. Weisenstein: 'Structure and Control of Thermoacoustic Instabilities in a Gas-turbine Combustor', Combust. Sci. and Tech. 138 (1998), pages 213–232. The required expenditure is considerable, however. It is also not possible to adapt the operation selectively to specific requirements with regard to the characteristics of the combustion—for example especially low $NO_x$ emission.

SUMMARY OF THE INVENTION

The invention is based on the object of stabilizing the combustion by the simplest possible means and to achieving the most favorable possible results with regard to specific characteristics of the combustion, especially reduction of the pulsations and pollutant emission, in particular the $NO_x$ emission. It was found that the way in which the combustion proceeds is influenced strongly by the mass flow distribution of the fuel introduced into the premix burners.

In the case of the burner system according to the invention, the distribution of the mass flow can be set. Therefore, especially on the basis of the operating method according to the invention, it can be set such that the way in which the combustion proceeds is in each case optimized to a great extent with respect to specific requirements such as low pollutant emission and low pulsations, or changing weightings of a number of such requirements.

BRIEF DESCRIPTION OF THE DRAWINGS

The invention is explained in more detail below on the basis of figures, which merely represent an exemplary embodiment and in which FIG. 1 schematically shows a premix burner with an upstream distributing device, FIG. 2 schematically shows a setup of a test system for determining favorable mass flow distributions.

FIGS. 4, 5a,b generally show the optimizing method used for the determination of favorable mass flow distributions, where

WAYS OF IMPLEMENTING THE INVENTION

A premix burner 1 (FIG. 1) of a fundamentally known construction, as used in an internal combustion engine of a gas turbine, has the form of a truncated cone with an outflow opening 2 at its wide end. Provided along two diametrically opposite generatrices are air inlet slots 3a, b, on the outer sides of each of which sixteen inlet openings 4 for the fuel supply are arranged, forming the end points on the burner side of a distributing device 5 formed as a pipeline and valve system.

Figure 1:
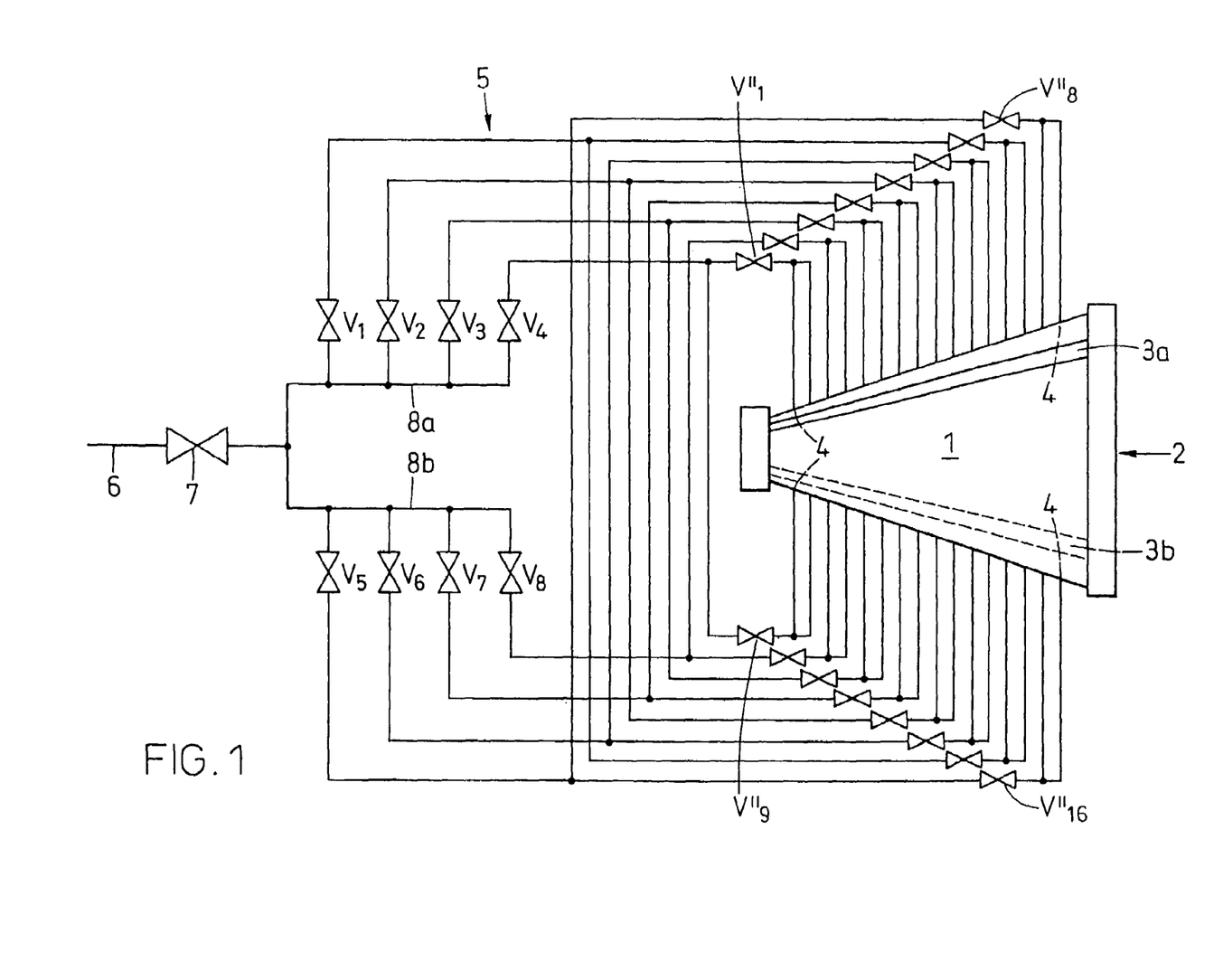

Represented by way of example in FIG. 1 is a distributing device 5 of a relatively complex form. Its input is formed by a feed line 6, which is connected to a fuel source, for example a stationary gas line (not represented) and is provided with an input valve 7, by means of which the fuel supply is limited for safety reasons. Subsequently, the main line 6 branches into two branch lines 8a, b, from each of which there branch off four supply lines, in which a control valve is respectively located. The control valves are designated by $V_1$ to $V_8$. Following the respective control valve, the supply line branches to two pairs of inlet openings 4, lying opposite each other, to be precise in such a way that axially successive groups of four inlet openings respectively have fuel applied to them via one of the control valves $V_1, \ldots, V_8$. The two inlet openings 4 arranged on the same side are preceded in each case by an on/off valve. By means of the on/off valves $V''_1, \ldots, V''_{16}$, it is possible in each case for the fuel supply to two successive inlet openings 4 to be selectively blocked.

The control valves $V_1, \ldots, V_8$ are formed in such a way that specific mass flows $m_1, \ldots, m_8$ can be set with them. The distribution of the fuel mass flow between the inlet openings is generally set such that especially favorable values are achieved with respect to specific requirements. In particular, the mass flow distribution can be set such that the $NO_x$ content of the exhaust gases of the gas turbine is low and at the same time the amplitudes of pulsations, such as occur during nonuniform combustion, are small. The mass flow distribution may in this case correspond to a Pareto solution with regard to a target variable comprising these two components or else some other target variable, as explained in more detail further below.

Figure 3:
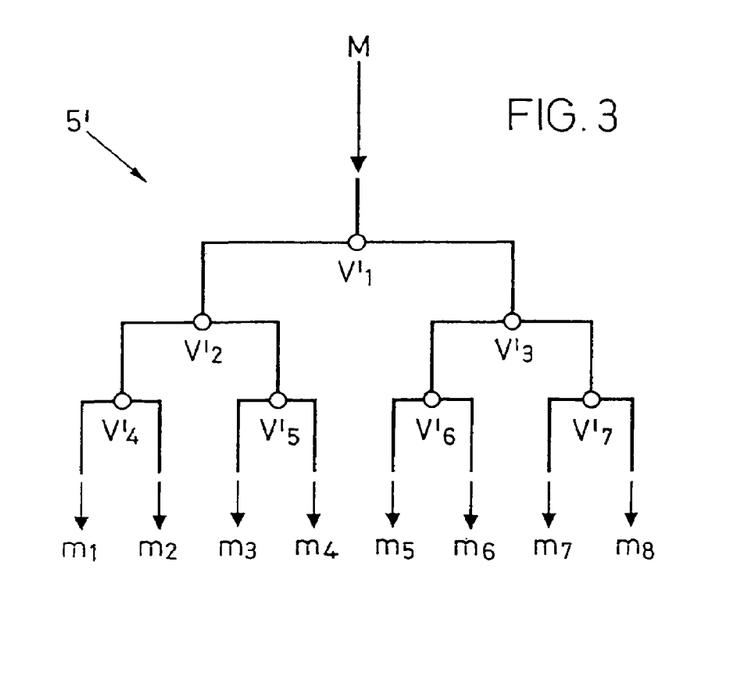
FIG. 3 shows a diagram of a tree structure as a simplified model for the mass flow distribution.

The construction of the distributing device 5 may deviate in many respects from that described. For instance, each control valve may be assigned a larger or smaller group of inlet openings or else only a single inlet opening. The on/off valves may be inserted at a different location or else be omitted, or such valves may be used exclusively, for example one for each inlet opening. The topology may also be different, for example, as in the case of the distributing device 5' represented in FIG. 3, it may correspond to a tree structure of three-way valves, as described in more detail further below.

Figure 2:
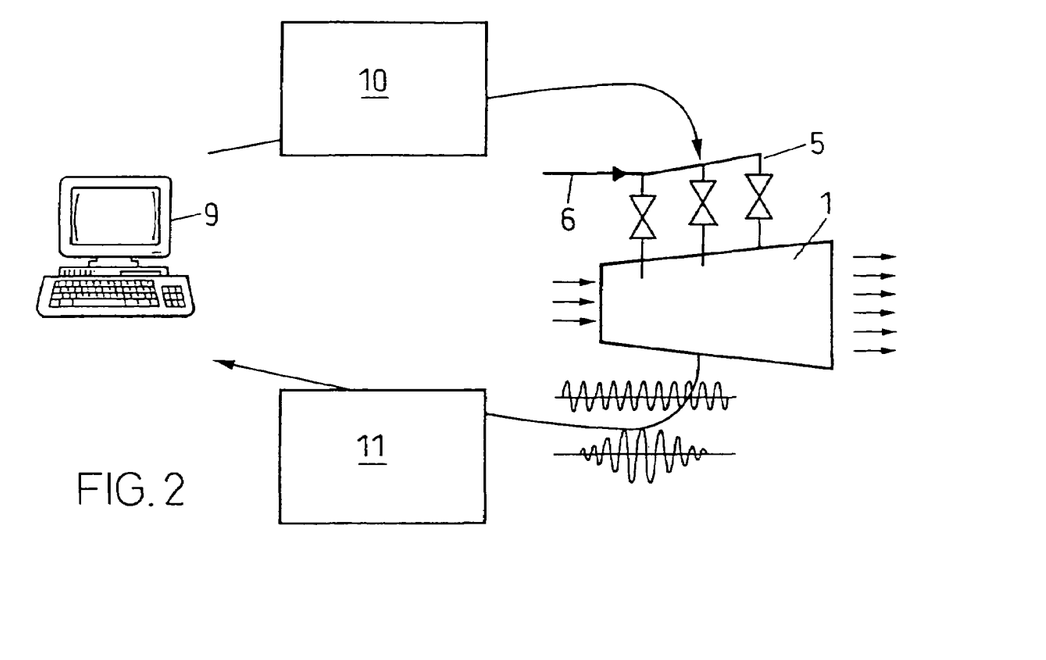

Mass flow distributions which are as favorable as possible with regard to a target variable, the components of which are formed by specific characteristics, especially the emission of $No_x$ and the maximum of amplitudes of pulsations occurring, are formed by means of a test setup. The test setup (FIG. 2), in which a distributing device 5 is arranged upstream of a premix burner 1 formed in the way described in connection with FIG. 1, comprises a data-processing system 9. The distributing device 5, not represented in detail, is constructed for example in the way described in FIG. 1, but without the on/off valves. The control valves $V_1, \ldots, V_8$ are set by a control unit 10 on the basis of values output by the data-processing system 9. A measuring unit 11 supplies the characteristics measured during the combustion to the data-processing system 9. The test setup may also comprise a number of premix burners and distributing devices or a complete burner system. This is a question of the acceptable expenditure. It has been found, however, that mass flow distributions determined on a single premix burner generally result in corresponding characteristics in a complete burner system.

In the case of the test setup represented, a specific total mass flow M is respectively fed to the premix burner 1. Used in this case for the representation of the mass flow distribution in the data-processing system 9 is a model in which the distributing device 5 is mapped onto one corresponding to the distributing device 5' (FIG. 3), i.e. it is represented by a binary tree structure comprising three-way valves $V'_1, \ldots, V'_7$. The position of each of the three-way valves can be represented there by a distributing parameter p, $0 \leq p \leq 1$, which corresponds to the proportion attributed to the left-hand output in the distribution of the mass flow between the left-hand and the right-hand output. If the individual mass flows at the outputs of the control valves $V_1, \ldots, V_8$ are designated by $m_1, \ldots, m_8$, the distributing parameter of the valve $V'_1$ becomes $p_1=(m_1+ \ldots +m_4)/M$, that of the valve $V'_2$ becomes $p_2=(m_1+m_2)/(m_1+ \ldots +m_4)$, etc., and conversely $m_1, \ldots, m_8$ can easily be calculated from the distributing parameters $p_1, \ldots, p_7$ on the basis of $m_1=Mp_1p_2p_4$, $m_2=Mp_1p_2(1-p_4)$, and so on. The fact that the data-processing system 9 works with the model described has the effect that only seven parameters are required, and consequently the dimension of the determination domain (see below) is reduced by 1.

If, as in the present case, optimization is carried out with regard to a number of independent characteristics, it is generally not possible to select a specific optimum solution, but nevertheless a set of so-called Pareto-optimal solutions can be found, respectively characterized in that they are not Pareto-dominated, i.e. that there is no other solution which would be more favorable with regard to one characteristic and no less favorable with regard to any of the other characteristics. To put it another way, a solution which is more favorable with regard to at least one characteristic than a Pareto-optimal solution is inevitably less favorable than the latter with regard to at least one other characteristic.

The target variables of the Pareto-optimal solutions usually form a portion of a hypersurface in the target domain defined by the target variables, known as the Pareto front, which bounds the target set, i.e. the set of target variables of all the possible solutions, from areas of the target domain which would be more favorable but are not accessible. The Pareto front is adjoined by further hypersurface portions bounding the target domain, which contain solutions which although not Pareto-optimal under some circumstances are nevertheless of interest.

Suitable for the search for Pareto-optimal solutions are semi-stochastic methods, which are based for example on the natural process of evolution of living beings by crossing, mutation and selection and are accomplished by means of so-called evolutionary algorithms. These are used for iteratively approximating Pareto-optimal solutions on the basis of specific, for example randomly distributed, starting variables for a set of determination variables, in that the determination variables are varied with each iteration step, for example by recombinations and random mutations, and a new set of determination variables is selected from the test variables produced in this way, by selection based on the corresponding target variables. As soon as a specific terminating criterion is satisfied, the iteration is terminated.

Figure 4:
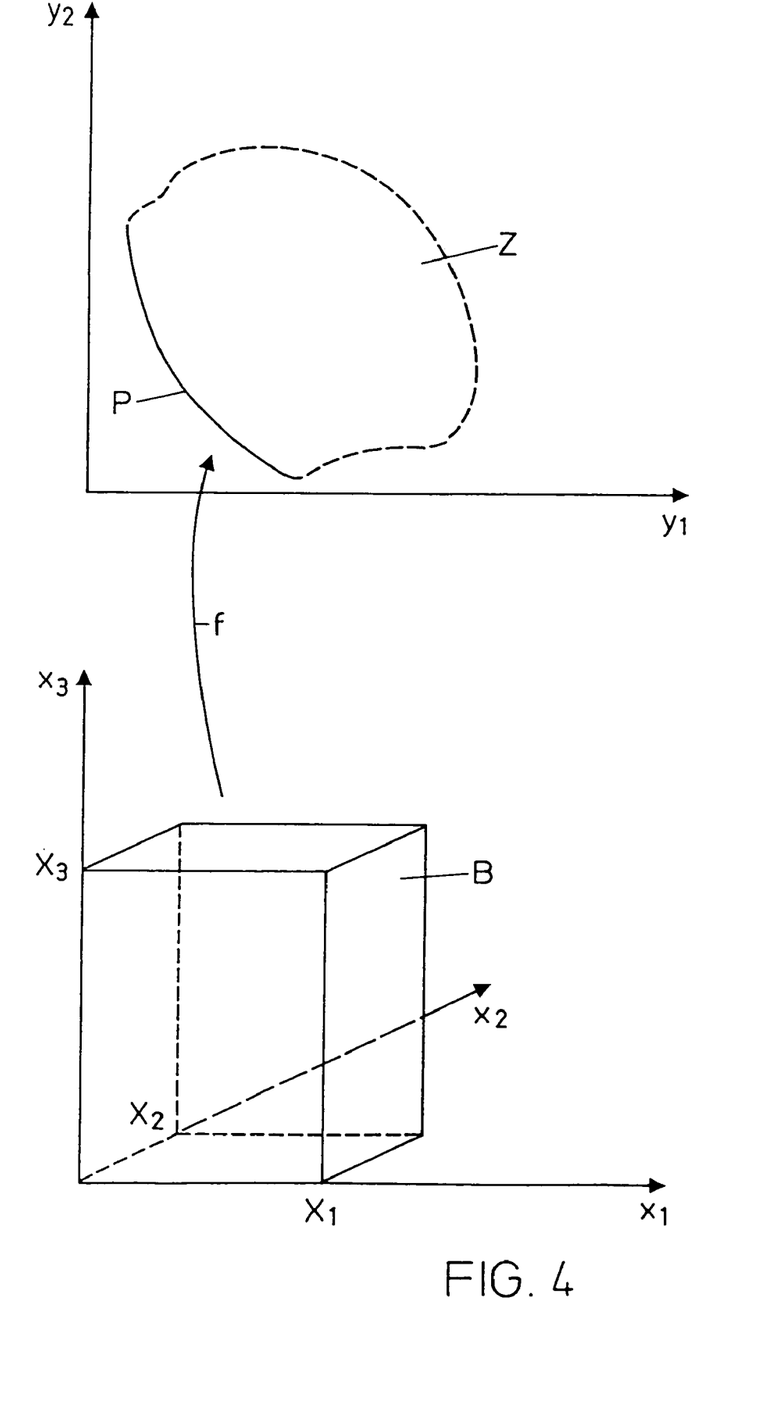
FIG. 4 shows the determination set of a typical optimization problem and its mapping onto the corresponding target set and FIGS. 5a,b show steps in the selection of new determination variables from previously generated test variables in the target domain.

Represented in FIG. 4, for example, is a situation in which the determination domain is 3-dimensional, with real parameters $x_1$, $x_2$ and $X_3$. The determination set B over which the determination variable is varied is restricted by the variables respectively lying between zero and an upper limit $X_1$, $X_2$ and $X_3$, respectively, and therefore forms a cuboid, the product of the intervals $[0,X_1]$, $[0,X_2]$ and $[0,X_3]$. By means of a known functional relationship f, which may be provided by a mathematical model or by a test setup, each determination variable $x=(x_1,x_2,x_3)$ is assigned a target variable $y=f(x)$, which lies in a target set Z. It is a subset of the in this case 2-dimensional target domain, i.e. $y=(y_1, y_2)$, where $y_1$ and $y_2$ represent two characteristics which are to be optimized.

The target set Z may be the complete image set of the determination set B under the mapping f or part of the same restricted by constraints.

The target variables of the solutions sought form a so-called Pareto front P (solid line), which bounds the target set Z with respect to small, i.e. favorable, values of the characteristics $y_1$, $y_2$. Laterally adjoining the Pareto front P are solutions which likewise lie on the border of the target set Z. They are not Pareto-optimal, since for each of the solutions a solution in which both characteristics are more favorable can be found on the Pareto front, but under some circumstances they may likewise be of interest.

It is then primarily a matter of finding determination variables x with which the associated target variables $y=f(x)$ lie as close as possible to the Pareto front P. They are also to be distributed with some degree of uniformity over the entire Pareto front P and as far as possible also over the border areas adjoining the latter of the target set Z. Solutions of this type are generated by means of an iterative evolutionary or genetic algorithm, which forms the basis of a program which runs on a data-processing system. In this case, generally each variable is coded by a bit vector of a length L, which is for example 32.

For finding approximately Pareto-optimal solutions, firstly starting variables lying in the determination set B which, as the first set of determination variables, form the starting point of the iteration are generated. They may, for example, be distributed regularly or randomly over the determination set B. Then, as many iteration steps as it takes to satisfy a terminating criterion are carried out. This criterion may be that a specific maximum number of iteration steps has been carried out or a specific computing time has elapsed or else that the changing of the target variables has remained below a specific minimum during a specific number of iteration steps.

With each iteration step, the following substeps are carried out:

Recombination: new variables are respectively generated by combination of parts of a number of determination variables from the present set. For example, firstly either all the possible ordered pairs of determination variables are formed or else only some of those determined by means of a random generator. Each determination variable forms a vector comprising n real parameters. Then, a number 1 is likewise generated by means of a random generator, where $0 \leq 1 \leq n$, and then two new variables are formed in that the first 1 parameters are taken from the first determination variable and the remainder are taken from the second determination variable, and vice versa.

Mutation: for the variables generated in the recombination step, variables generated by means of a random generator, for example on the basis of a normal distribution, are added. Of course it is also possible in such a way to generate a number of starting variables from one variable.

Figure 5A:
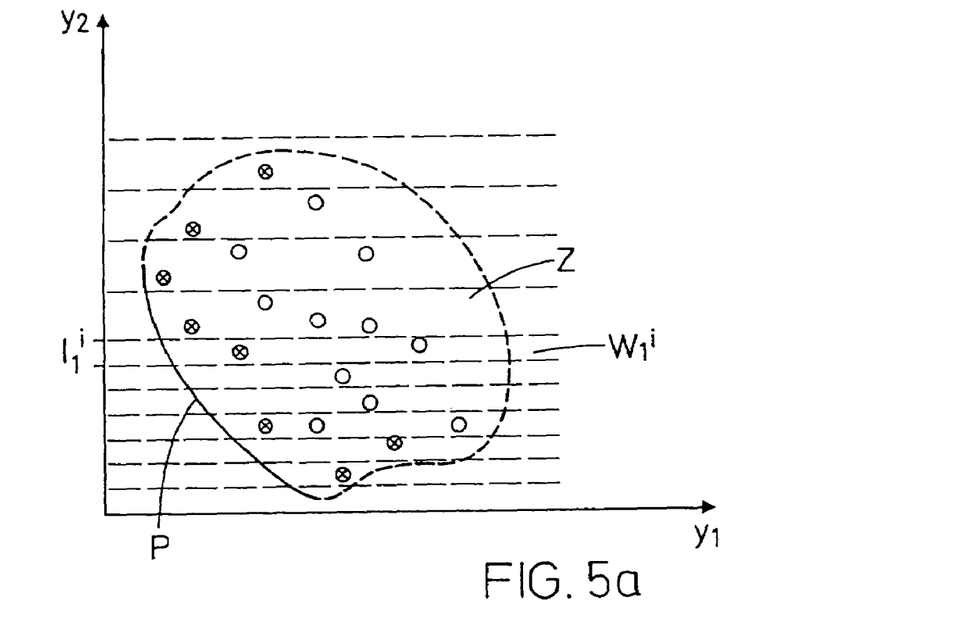

Selection: the two steps mentioned above produce a set of test variables which is generally greater than the original set of determination variables. From this usually relatively large set of test variables, a new set of determination variables which, on average, are particularly favorable is then selected. The procedure for the selection is of great significance for the development of the iteration. To control the approximation to the Pareto front P and two adjacent areas of the border of the target set Z, especially to achieve a broad approximation, the following procedure is preferably adopted:

In a first selection step, the hyperplane, identified by the condition $y_1=0$, of part of the target domain which comprises the target set Z and which in the 2-dimensional case represented (FIG. 5a) coincides with the $y_2$ axis, is subjected to a partition into subsets, which in this case form intervals $I_1^i$. Starting from this basis, the said part of the target domain is subdivided into subsets $W_1^i$, which are the original images of the orthogonal projections of the same along the positive $y_1$ axis onto the said intervals $I_1^i$. To put it another way, the subset $W_1^i$ for a specific i is the set of all points $y=(y_1,y_2)$ in the said part of the target domain for which $y_1>0$ and $y_2$ lies in $I_1^i$. In FIG. 5a, it forms a strip parallel to the coordinate axis $y_1$.

For each of the non-overlapping subsets $W_1^i$, that test variable for which $y_1$ is optimal, i.e. minimal, is then determined and selected. In FIG. 5a, the target variables of all the test variables are marked by a circle O, those of the test variables selected in the individual $W_1^i$ are identified by a superposed multiplication symbol x.

In a second selection step, the part of the target domain containing the target set Z is subdivided in an entirely analogous way into subsets $W_2^j$ and there, too, again for each subset that test variable for which $y_2$ is optimal, i.e. minimal, is determined and selected. The solutions are identified in FIG. 5b by a superposed plus symbol +. The new set of determination variables, with which the next iteration step is then undertaken, are composed of the test variables selected in both selection steps.

Figure 5B:
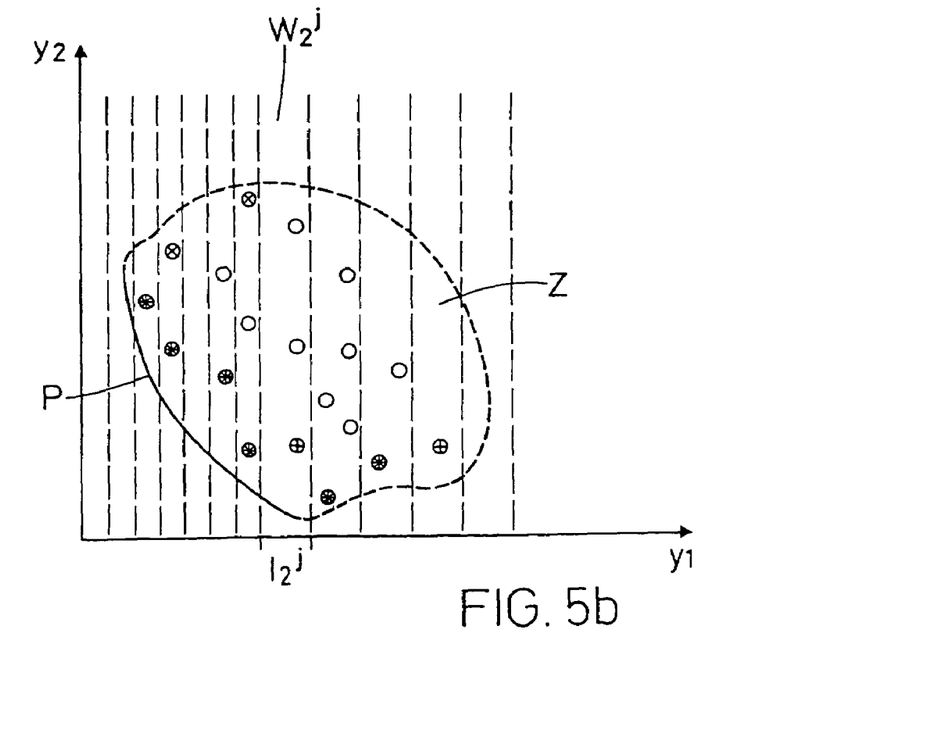

In relatively many cases, in particular in the proximity of the middle area of the Pareto front P, it is the same test variables that are determined in both cases, so that one selection step is usually adequate to establish these test variables. In the lateral border areas, and in particular in the part of the border of the target set Z adjoining the Pareto front P, this is generally not the case, however. If importance is also attached to the determination of solutions in these areas, it is necessary to carry out both selection steps.

There is of course also the possibility of respectively selecting in each of the subsets not just a test variable but a selection set of test variables, for example the k most favorable with regard to the remaining component, where $k>1$.

The procedure described for the selection can easily be transferred to cases in which the dimension m of the target domain is greater than 2. In this case, preferably all m hyperplanes which are characterized in that one of the coordinates $y_1, \ldots, y_m$ is equal to zero will be formed and a partition of the same into subsets carried out in each case. This can take place by each of the coordinate axes being subdivided into intervals from the outset and all the products of intervals into which the coordinate axes spanning the hyperplane are subdivided then respectively being used as subsets of a hyperplane.

In each of the subsets which are formed by the original images of the orthogonal projections onto the subsets of the hyperplanes, the test variable most favorable with respect to the remaining component is then selected and, finally, the union of the selected test variables is formed over the subsets and hyperplanes to produce the new set of determination variables. Depending on whether a determination of solutions that is as comprehensive as possible is of interest or, in particular, it is wished to establish solutions lying in specific areas, the selection may also consider only some of the hyperplanes, especially since, as explained above in the example, the central areas of the Pareto front are usually already covered quite well in the first selection step.

The actual procedure, determined by the algorithm, may of course deviate from that described above by a different combination of individual steps etc., in particular it is not absolutely necessary for the selection steps described to be carried out one after the other.

The subdivision into intervals may in each case be scaled uniformly or logarithmically, but may also be finer for instance in areas in which there is a particular interest. The partitions into subsets may be maintained or changed during the overall iteration, for example adapted to the distribution of the target variables. Instead of or in addition to hyperplanes, subdomains of a smaller dimension may also be used, but then optimization has to be carried out in each subset with respect to a number of characteristics, which requires further stipulations or a recursive procedure.

For instance, a wide variety of modifications of the procedure described are conceivable for the selection. The procedure described has the advantage that the stipulations regarding the position of the target variables allow the determination of the solutions to be respectively controlled in such a way that the target variables derived from the same are finally distributed in a desired way over a border area of the target set. Of course, various modifications are also possible for the recombination and the mutation. These substeps are also not both required in every case.

Figure 6A:
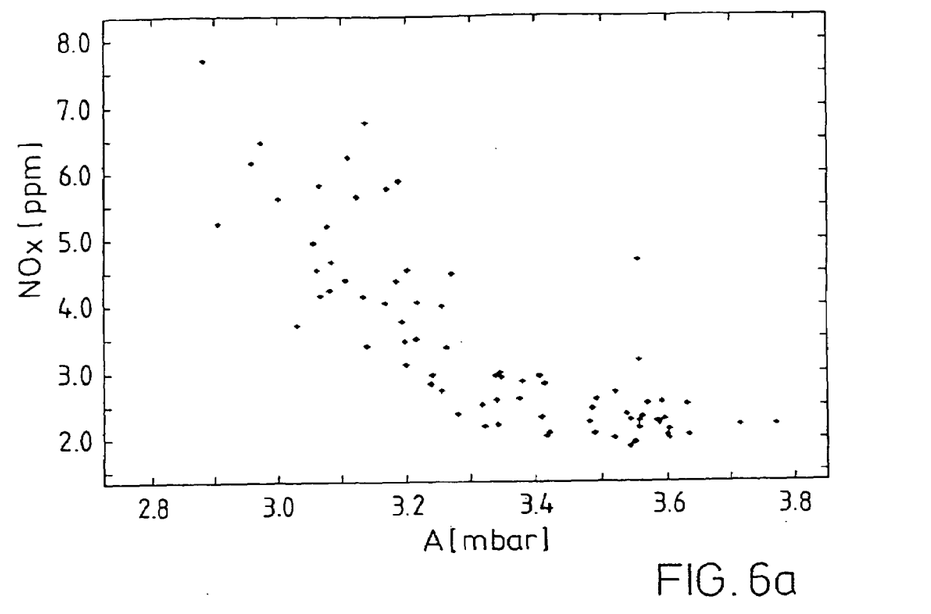
FIGS. 6a,b show the target domain of the present optimization problem after 20 and 64 iteration steps, respectively.
Figure 6B:
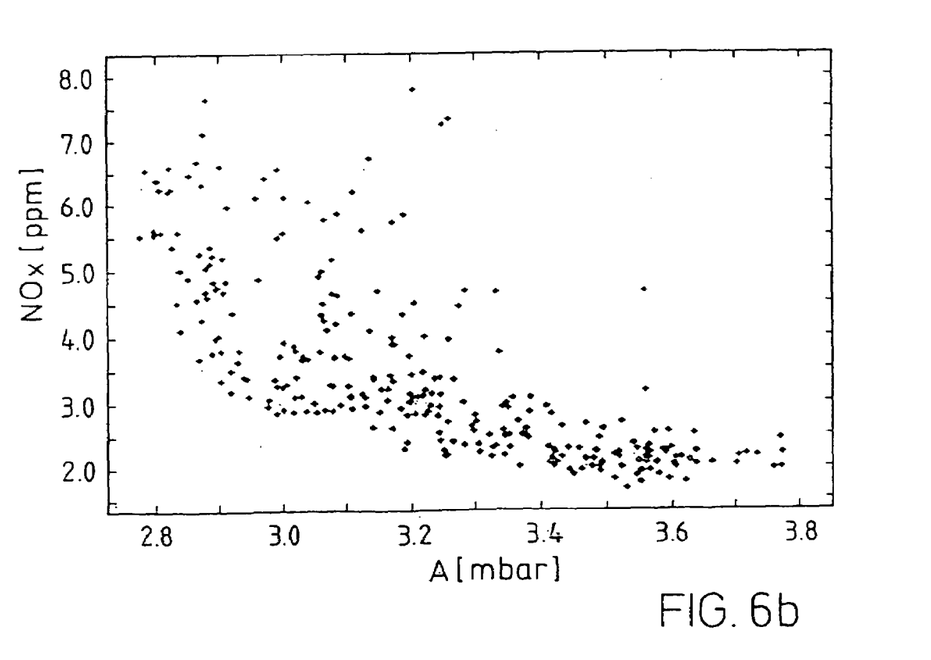

In the case of the present optimization problem, the determination domain is defined by the real distributing parameters $p_1, \ldots, p_7$, which may respectively vary over the interval $[0,1]$. The target domain, on the other hand, is defined by the two characteristics $NO_x$ content and maximum amplitude A of the pulsations occurring. It is represented in FIGS. 6a, 6b, to be precise with the target variables of the 100 solutions determined after 20 iteration steps (FIG. 6a) and the 320 solutions determined after 64 iteration steps (FIG. 6b). The two mappings clearly show how more and more, in particular favorable, solutions are determined and the limit of the set of target variables gradually emerges toward the favorable values of the characteristics—the Pareto front. Of course, solutions can be determined for various values of the total mass flow M, so that determination variables suitable not only for full load but for a relatively great working range are available.

The burner system can then be operated in each case in such a way that characteristics such as $NO_x$ emission and maximum amplitudes of pulsations occurring assume specific values, in particular those which lie in or close to the Pareto front, in that the previously determined relationships between the target variables composed of such characteristics and the determination variables comprising the distributing parameters $p_1, \ldots, p_7$ are used and the mass flows $m_1, \ldots, m_8$ are respectively determined on the basis of the same for all premix burners such that the target variable assumes the desired value. In this case, after changing requirements, it is also possible to change between a number of settings. For example, it is possible in the case of suddenly occurring combustion fluctuations, for example because of a change in the load, and pulsations caused as a result, to choose for a short time a setting with which stable, virtually pulsation-free, combustion occurs and, in exchange, to accept temporarily higher $NO_x$ values.

If, in addition to the control valves, the distributing device 5 also contains on/off valves, as represented in FIG. 1, the determination domain must be supplemented by corresponding binary switching parameters, which are respectively represented by a bit which can assume the values 0 for 'closed' and 1 for 'open'. The occurrence of these parameters changes virtually nothing concerning the way in which the optimization proceeds as described further above. A change is necessary only in the case of the mutation. Here it may be provided, for example, that each switching parameter, that is each bit, is inverted with a specific, for example fixed, probability, that is 0 changes into 1 and 1 changes into 0.

In the case of a complete burner system, the distributing devices are generally of a more simple construction, to limit the expenditure and the probability of failure, than those used for the optimization. After finding the most favorable determination variables by means of the relatively complex distributing device 5 of the test setup, deliberately simplified distributing devices, with which in particular the mass flow distributions coming into consideration can be set, can then be designed for the burner system.

Figure 7:
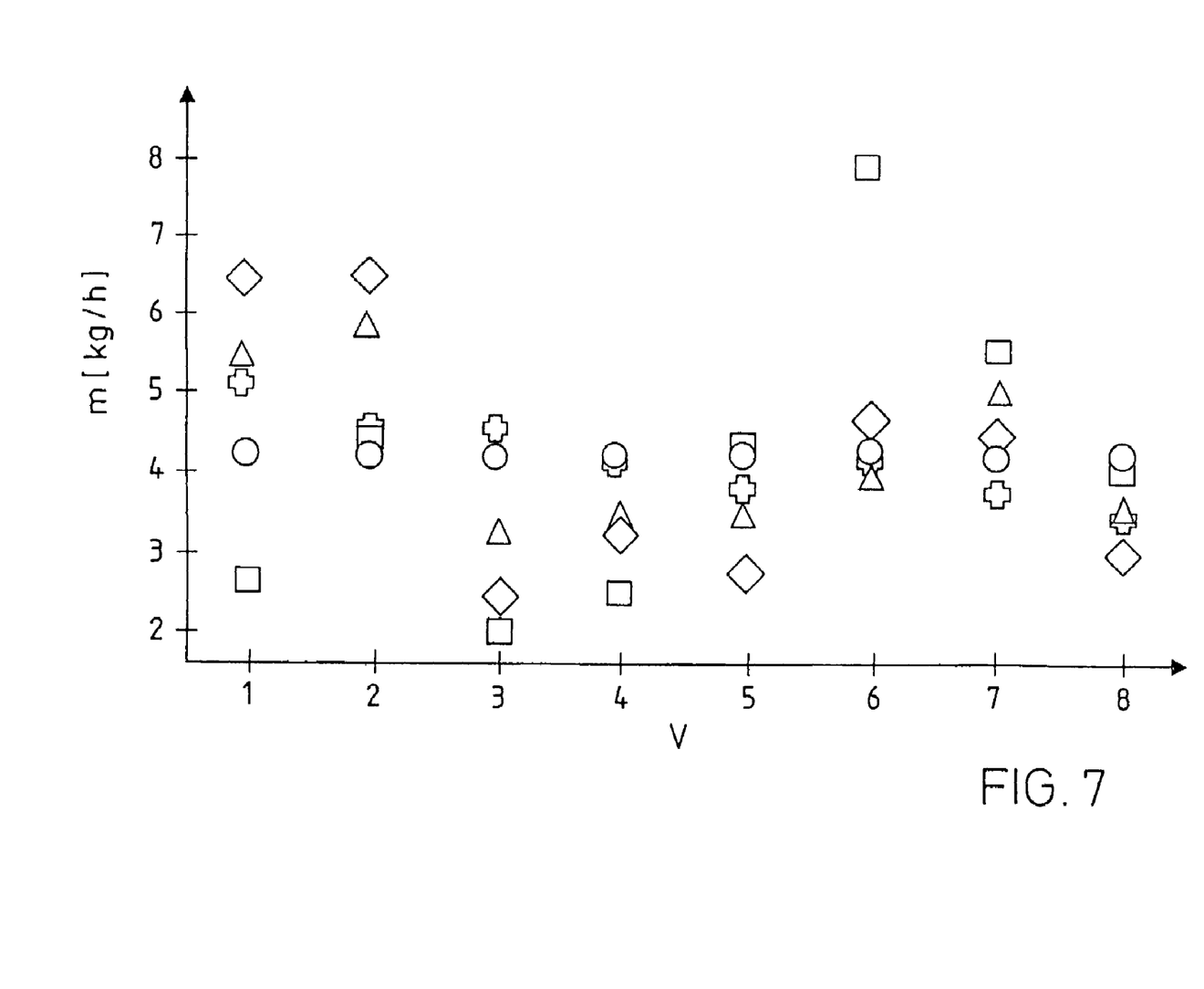
FIG. 7 shows mass flow distributions according to selected solutions of the optimization problem.

FIG. 7 shows as examples five different solutions determined under full load, i.e. mass flow distributions, the x-axis showing the numbers of the control valves $V_1, \ldots, V_8$ and the y-axis showing the mass flows $m_1, \ldots, m_8$. The characteristics thereby achieved can be taken from the following table:

| Solution | Symbol | $NO_x$ content [ppm] | maximum amplitude [mbar] |
|---|---|---|---|
| 1 (equipartition) | Circle | 2.5 | 3.12 |
| 2 | Rhombus | 3.0 | 2.92 |
| 3 | Triangle | 4.0 | 2.83 |
| 4 | Cross | 5.0 | 2.80 |
| 5 | Square | 2.0 | 3.37 |

Solutions 3 and 4 offer particularly favorable values as far as the pressure surges occurring are concerned, while solution 5 shows the best exhaust gas values, although with high values for the pressure maximum. Solution 2, on the other hand, again offers very good characteristics in this respect, for which only a slightly increased $NO_x$ emission has to be accepted.

Of course, various deviations from the example described are possible. For instance, additional characteristics or different characteristics than those described, such as for example CO emission, average amplitude of the sound generated, and the like, can be taken as a basis for the optimization. The optimization method may also deviate from that described.

LIST OF DESIGNATIONS 1 premix burner
2 opening
3a,b air inlet slots
4 inlet openings
5 distributing device
6 main line
7 input valve
8 branch lines
9 data-processing system
10 control unit
11 measuring unit

The invention claimed is:

1. A method for operating a burner system for use with a fuel source and a fuel source feed line connected to the fuel source, with at least one swirl-stabilized premix burner having a plurality of inlet openings, and a distribution device by which the inlet openings in the premix burner can be connected to the fuel source and the mass flow distribution between the inlet openings set, the method comprising:

determining a number of determination variables each comprising a vector from a determination set which is a subset of an n-dimensional domain and, with each determination variable, setting a mass flow distribution in a test setup with at least one premix burner and at least one distribution device, the mass flow distribution being set based on the determination variable, and measuring an associated target variable comprising a vector from a target set which is a subset of an m-dimensional domain, on the test setup, and selecting a plurality of determination variables on the basis of the associated target variables, which determination variables correspond at least approximately to Pareto solutions where for every solution in which one component has a more favorable value, at least one component has a less favorable value;

selecting a determination variable from the plurality of determination variables depending on the mode of operation, a requirement for the target variable, or both; and setting the mass flow distribution based on the selected determination variable.

2. The method as claimed in claim 1, wherein the components of the determination variable correspond to the mass flows to inlet openings or groups of inlet openings of the at least one premix burner, or are variables from which the mass flows can be derived.

3. The method as claimed in claim 1, wherein the concentration of at least one pollutant forms a component of the target variable.

4. The method as claimed in claim 1, wherein a measure of the pulsations occurring in the burner system forms a component of the target variable.

5. The method as claimed in claim 3, wherein the at least one pollutant comprises NOx concentration in exhaust gas.

6. The method as claimed in claim 4, wherein the measure comprises a maximum amplitude of the pulsations.

7. The method as claimed in claim 1, wherein determining Pareto solutions comprises determining starting variables serving as a set of determination variables; and further comprising:
 carrying out iteration steps with the data processing system until a terminating criterion is satisfied including determination variables by generating from the set of determination variables a set of test variables respectively lying in the determination set, from which set of test variables the new set of determination variables is selected in each case on the basis of the target variables which were measured for the mass flow distribution fixed by the determination variables.

8. The method as claimed in claim 7, wherein generation of the test variables from the set of determination variables comprises random mutation or recombination of the determination variables using the data-processing system.

9. The method as claimed in claim 7, wherein selection of the new set of determination variables from the set of test variables involves determining a plurality of coordinates of the target set, and for each of them
 dividing the hyperplane characterized by the coordinate equaling zero into subsets,
 selecting, in the inverse image of each subset under orthogonal projection parallel to the said coordinate, according to the value of its component which corresponds to the said coordinate, at least one target variable which was measured for the mass flow distribution fixed by a test variable, and
 adding the at least one test variable to the new set of determination variables.

* * * * *